April 21, 1931.  S. B. SPATZ  1,802,160
DRAFT REGULATOR
Filed June 22, 1928  2 Sheets-Sheet 1

Inventor
Samuel B. Spatz,
Attorney

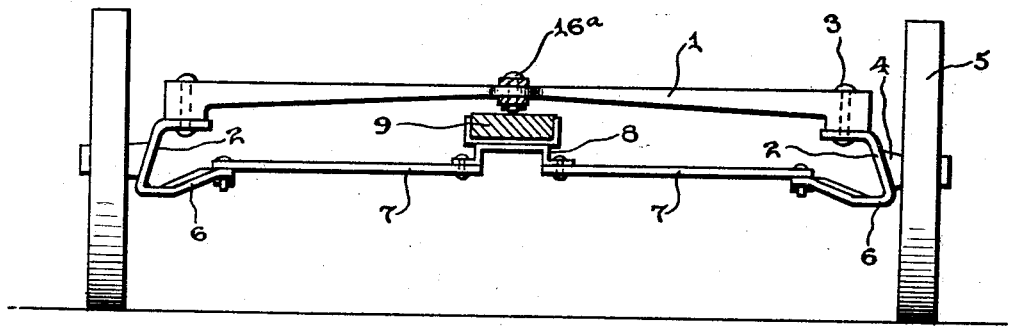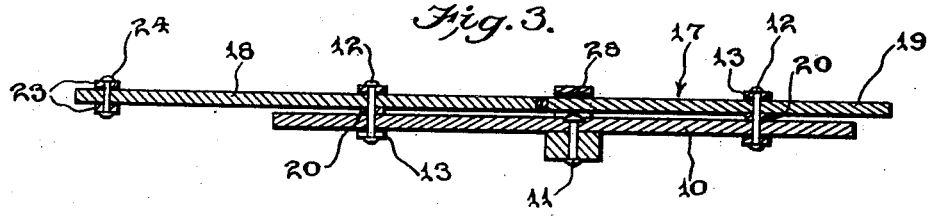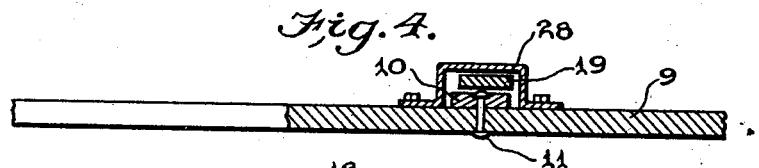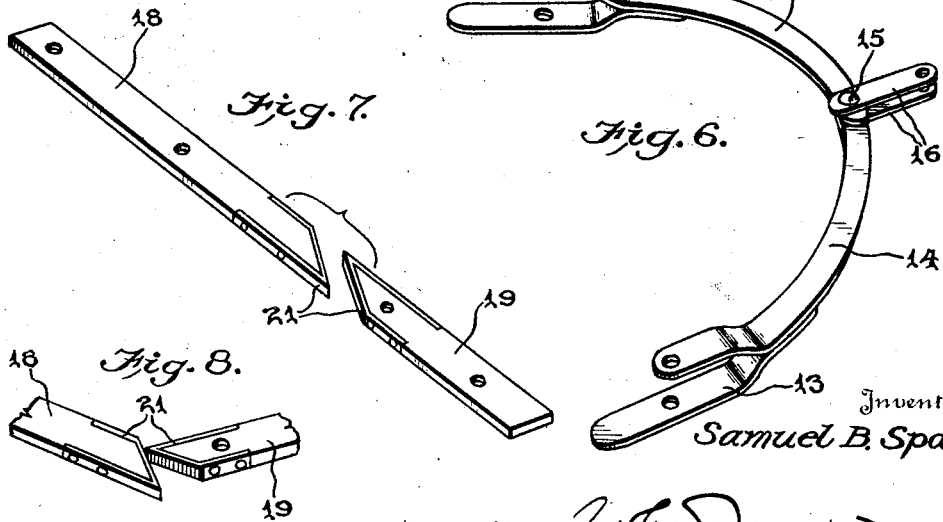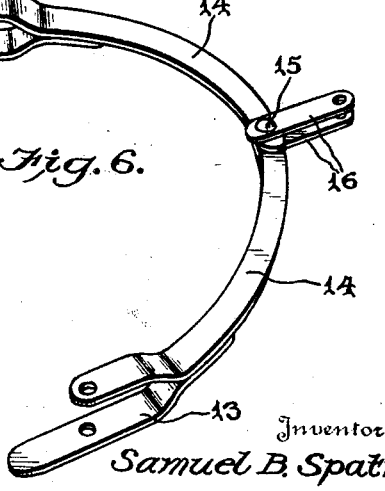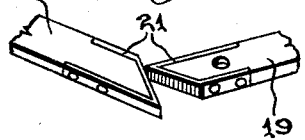

Patented Apr. 21, 1931

1,802,160

UNITED STATES PATENT OFFICE

SAMUEL B. SPATZ, OF UPPER TULPEHOCKEN TOWNSHIP, BERKS COUNTY, PENNSYLVANIA

DRAFT REGULATOR

Application filed June 22, 1928. Serial No. 287,423.

This invention relates to improvements in draft regulators or a governor-tree hitch for use with horse drawn vehicles.

The primary object of the invention is to provide a draft regulator including a sectional beam having bias cut contacting ends, the point of contact of which is adapted to shift under varying strains placed on either one of the sections, whereby excessive pull on one section will place additional burden on that section, and cause the animal or animals hooked to that section, to draw an increased proportion of the load.

Another object is to provide a draft regulator, designed to control the load automatically, and to always protect and save the weaker horse or horses. In this device, the control lies in the angular cut of 45 degrees that shifts the point of contact of the sections, two inches either right or left of the center of pull, and with it, about 20% of the load; so that the horse out-pulling the other or others, will have to pull his load, plus 20%, until the pull is again normal.

With the foregoing objects outlined and with other objects in view which will appear as the description proceeds, my invention consists in the novel features hereinafter described in detail, illustrated in the accompanying drawings, and more particularly pointed out in the appended claim.

Referring to the drawings,

Fig. 1 is a top plan view of my improved draft regulator shown attached to the front end of a manure spreader.

Fig. 2 is a vertical transverse sectional view, taken on line 2—2 of Fig. 1.

Fig. 3 is a similar view on line 3—3 of Fig. 1.

Fig. 4 is a vertical longitudinal sectional view of a detail, taken on line 4—4 of Fig. 1, and with certain parts omitted to facilitate illustration.

Fig. 5 is a sectional view on line 5—5 of Fig. 1.

Fig. 6 is a perspective view of a linkage arrangement which connects the sectional beam to the stationary axle.

Fig. 7 is a similar view of the sectional beam.

Fig. 8 is a perspective view of the contacting ends of the sectional beam, showing the same shifted out of alignment.

In the drawing, 1 indicates the stationary axle of a vehicle, provided at its ends with steering knuckles 2 which turn on the vertical shafts 3 and carry axles 4 for the steering wheels 5. Each steering knuckle has a forwardly extending arm 6, and these arms are pivotally connected by rods 7 to a saddle 8 in which the rear end of the tongue 9 rests. The tongue may be additionally supported by any suitable means as by a cross plank or plate 10 made fast to the tongue by a bolt or rivet 11.

Pivot pins or bolts 12 are equally spaced from the rivet 11, and are connected to the bifurcated ends 13 of the curved links 14, whose rear ends are pivotally connected to a pin 15, attached to links 16 that are pivotally secured to the central portion of the stationary axle, by a bolt or the like 16.

From the foregoing, it will be understood that when the front end of the tongue is swung horizontally, the tongue will fulcrum about the pivot 16a, causing the saddle 8 to shift and move the steering wheels in the same direction as the tongue, so that the vehicle may be properly steered.

A sectional beam 17 is mounted on the plate 10, and it includes the sections 18 and 19, which are pivotally mounted respectively on the bolts 12, and spaced from the plate by washers or the like 20. Adjacent ends of the beam sections are cut on the bias, as best shown in Figs. 7 and 8, and these angular end portions are protected by wear resistive metal strips 21.

A single tree or draft device 22 is pivotally connected to the outer end of one of the beam sections, by a link or links 23, secured by a pin 24 to the section 18. A double tree or draft device 25 is pivotally connected by links 26, and a pin 27, to the inner end of the other section 19, and by reference to Fig. 1, it may be seen that when the single tree 22, for instance, is drawn forwardly, the point of contact between the beams will be shifted relatively to the line 4—4 representing the center of pull effected, so that the horse pulling on the single tree will be subjected to an increase load. On the other hand, if the horses hitched to the double tree are out-pulling the third horse, the point of contact will be shifted in the opposite respect, relatively to the line 4—4, and the horses on the double tree will be subjected to an increase load; it being understood that as either section 18 or 19 is shifted, it will swing about its pivot pin 12.

A keeper 28 is fixed to the upper side of the tongue by any suitable means, and extends over the biased ends of the beam sections, to prevent the latter from unduly shifting or moving out of contact.

From the above, it will be apparent to those skilled in the art, that I have devised a novel draft regulator or governor-tree hitch which is especially useful in connection with farm implements, and one which will protect the weaker horse or horses, but by way of further explanation, it may be stated that all of the pull is from the center of the load outward; hence, there can be no extra strain on the tongue, and no extra grind on the front wheels.

By placing a block in the keeper 28, the beam sections may be prevented from shifting, and then the structure may be used as a regular two-horse hitch.

This governor-tree hitch will neither sag nor drag on the ground. Furthermore, it may be used with the third horse on either the right or left hand side. To permit this, the bolts 12 may be removed, and then the beam 17 may be turned upside down and shifted end for end, so that the single tree will be arranged at the right hand side, instead of at the left hand side, and then the bolts may be replaced. This feature makes the device especially useful for either a right or a left hand binder.

I am aware that changes may be made in the details disclosed, without departing from the spirit of the invention, as expressed in the claim.

What I claim and desire to secure by Letters Patent is:

A draft regulator for a vehicle, including links connected to the vehicle on a central line of draft; a sectional beam, the sections of which are pivoted to said links on opposite sides of said line, and at fixed distances therefrom said sections having beveled ends in contact adjacent said line; draft means on one section between its pivotal connection and beveled end, and draft means on the other section on the opposite side of the pivot point from its beveled end.

In testimony whereof I affix my signature.

SAMUEL B. SPATZ.